(12) United States Patent
Jacobs et al.

(10) Patent No.: US 7,877,744 B2
(45) Date of Patent: Jan. 25, 2011

(54) METHOD, SOFTWARE AND APPARATUS FOR ACTIVATING RESIDENT APPLICATIONS

(75) Inventors: Paul E. Jacobs, La Jolla, CA (US); Stephen A. Sprigg, Poway, CA (US)

(73) Assignee: Qualcomm Incorporated, San Diego, CA (US)

( * ) Notice: Subject to any disclaimer, the term of this patent is extended or adjusted under 35 U.S.C. 154(b) by 747 days.

(21) Appl. No.: 10/982,418

(22) Filed: Nov. 5, 2004

(65) Prior Publication Data

US 2008/0010361 A1 Jan. 10, 2008

(51) Int. Cl.
*G06F 9/44* (2006.01)
*G06F 9/445* (2006.01)

(52) U.S. Cl. ....................... 717/171; 717/176
(58) Field of Classification Search .......... 717/168–178
See application file for complete search history.

(56) References Cited

U.S. PATENT DOCUMENTS

| | | | | |
|---|---|---|---|---|
| 5,956,505 | A | * | 9/1999 | Manduley .................. 713/1 |
| 6,832,349 | B1 | * | 12/2004 | Seamans .................. 715/500 |
| 2004/0010579 | A1 | * | 1/2004 | Freese .................. 709/223 |
| 2004/0110494 | A1 | | 6/2004 | Cohen et al. |
| 2004/0205749 | A1 | | 10/2004 | Dalton et al. |
| 2007/0107067 | A1 | * | 5/2007 | Fountian .................. 726/33 |

OTHER PUBLICATIONS

Mock, "Remote Activation of Atomic Objects", IEEE, pp. 213-215, 1993.*
Chiasserini et al., "A Distributed Power Management Policy for Wireless Ad Hoc NetWorks", IEEE, pp. 1209-1213, 2000.*
Fielding et al., "Hypertext Transfer Protocol—HTTP/1.1", Jun. 1999, Network Working Group, pp. 1-13.*
International Search Report and Written Opinion - PCT/US05/040083, International Search Authority - European Patent Office - Sep. 24, 2007 (040609).
Supplementary European Search Report - EP05824295, Search Authority - Hague Patent Office, Jan. 27, 2010 (040609).

* cited by examiner

*Primary Examiner*—Ted T Vo
(74) *Attorney, Agent, or Firm*—James T. Hagler

(57) ABSTRACT

A system for detecting a preloaded inactivated core application and sending an activation inquiry request requesting an activation status associated with the preloaded inactivated core application. The system also includes sending the activation inquiry request over a network. The system also includes receiving the activation status associated with the preloaded inactivated core application. Also, included is a system for receiving, via a network, an activation inquiry request requesting an activation status associated with a preloaded inactivated core application, where the activation inquiry request is received on a remote computing device. The system also includes determining the activation status based on information associated with the remote computing device, and where such information stored remotely from the remote computing device. The system also includes sending, via a network, the activation status.

24 Claims, 10 Drawing Sheets

METHOD, SOFTWARE AND APPARATUS FOR ACTIVATING RESIDENT APPLICATIONS

BACKGROUND

1. Field

The present invention relates generally to the activation of logic resident on a computing device, and more specifically, to the activation of core applications resident on computing devices.

2. Background

System Designs

Advances in technology have resulted in smaller and more powerful personal computing devices. For example, there currently exist a variety of portable wireless devices, such as portable wireless telephones, personal digital assistants (PDAs), and paging devices that are each small, lightweight, and can be easily carried by users. Typically, these devices are severely resource constrained. For example, the screen size, amount of available memory and file system space, amount of input and output capabilities and processing capability may be each limited by the small size of the device. Because of such severe resource constraints, it is often typically desirable, for example, to maintain a limited size and quantity of applications residing on such devices. Certain constrained resources, such as memory and/or file system space, are often the driving resource constraints that prompt such design choices. However, even when such resource constraints exist and there exists a corresponding demand to limit the size and quantity of applications on such computing devices, it is not uncommon to also find a co-existing demand for certain "preloaded" applications, including core applications.

"Preloaded" applications are applications that have been loaded on a computing device before such computing devices have been delivered the end users. "Core" applications are typically those applications and/or engines that are generally known to have certain characteristics including, for example, those applications and/or engines that are known or expected to be frequently called by other applications and/or those applications and/or engines that perform critical functionality. For example, for certain computing devices in certain circumstances, a multimedia application engine is known to be an application engine that is frequently called by a number of applications, and as such, such multimedia engine it is sometimes preloaded on certain computing devices as a core application. If this application was not preloaded on the computing device prior to delivery, the often used aspect of the application and/or engine, in certain circumstances, would almost certainly require a subsequent interactive downloading, over a network, of the application and/or engine post-delivery—an interactive/post-delivery procedure that could have been avoided with an initial preload.

Typically, the preloading of applications is performed by entities such as an Original Equipment Manufacturer (OEM) or by an Application Specific Integrated Circuit (ASIC) manufacturer. In one example, an OEM directly preloads one or more core applications on such devices at the OEM's manufacturing facility. In another example, OEMs indirectly provide core applications where the OEM includes ASIC chips, already preloaded with one or more core applications at the ASIC manufacturer's facility, into a final computing device. As described, the actions of at least two types of entities, OEMs and ASIC chip manufacturers, can individually, separately or together, result in the preloading of applications on computing devices.

Core applications are currently known to be selectively preloaded in both activated and an inactivated states. The "activated state" denotes an application that is configured to be called, and to execute when called. In contrast, the "inactivated state" denotes an application that is not presently configured to be either called, or to execute when called. For example, currently, some manufacturers (ASIC or computing device OEMs) sometimes include in their product (i.e., IC chips & computing devices) an application that is optionally available to the end user. Typically, such optional applications do not include core applications. Further, such optional applications are provided by the manufacturers in either an inactivated state or activated state. Further, regardless of the state that the application is provided, the application typically forever remains in such state, and therefore, for example, the manufacturer is generally not known to change the activated/inactivated state once the computing device has been delivered to the end user. In operation, currently, preloaded inactivated applications sometimes initially appear to be active applications to the user, i.e., display as an active selection on a user interface, and such applications may be selected by a user, (either directly or indirectly), and in response, the computing device displays a message indicating that an error was encountered in attempting to execute such application.

A corresponding aspect to this supplying of preloaded inactivated applications by manufacturers is that such manufacturers are able to realize variable pricing based on the active functionality available within the product at the time of delivery. Manufacturers are able to charge higher prices for products containing activated preloaded applications than products that are either totally absent such applications or have such preloaded applications inactivated prior to delivery. As such, a manufacturer, for example, can use a tiering strategy where the manufacturer either excludes the application from the device or provides the device with such application in an inactive state to allow the device to be sold at a lower price to lower-end markets. However, because the functionality available at the time of delivery remains the same functionality over the life of the product, once a particular preloaded inactivated application is delivered in an inactivated state the functionality associated with such application is forever dormant, and any associated potential revenue associated with such functionality is typically forever lost.

Many computing devices, including wireless computing devices, are capable of interactively downloading applications over a network, including a wireless network. Unlike the preloaded applications that are typically preloaded in a controlled environment, (e.g., while under the control of the manufacturer), such interactively loaded applications are loaded in a relatively uncontrolled environment that gives rise to the need to utilize certain authentication and authorization methods to assure system integrity and to police authorized usage. One common approach of providing such authentication and authorization is to adopt the use of digitally signed licenses. Digital signing of applications and components prevents those components from being modified. This digital signature can also provide other benefits such as providing linkage back to the original developer, protecting license data, etc.

A specific example of a system that provides for the interactive download of applications are those currently publicly available versions of the Binary Runtime Environment for Wireless® (BREW®) software platform developed by Qualcomm, Inc., of San Diego, Calif. BREW® is generally known to be a thin veneer over a telephone's operating system, which, among other features, often provides interfaces to hardware features particularly found on personal wireless devices. BREW® is also provided at a relatively low cost with respect to demands on device resources and with respect to the price paid by consumers for computing devices containing the software platform.

Other features of BREW® include its end-to-end software distribution platform that provides a variety of benefits for wireless service operators, software developers and computing device consumers. The BREW® end-to-end software distribution platform includes logic distributed over a server-client architecture, where the server performs, for example, billing and application distribution functionality, and the client performs, for example, application execution and user interface functionality. One aspect of BREW® is its functionality that provides to a user an environment where a user can selectively identify and selectively purchase an application for execution on the user computing device where a selected application is wirelessly downloaded to the computing device in response to the actions of the user. Such functionality includes the generation of a cost amount that appears on a subsequent phone bill of the user. As such, BREW® contains functionality that handles all the billing, security, and payments to desired entities, where, for example, BREW® directs payments to the appropriate entities associated with the consumer transaction, such as payments to the wireless service operators and to the corresponding software developers.

Although certain applications may be typically considered as required "core" applications by many different computing devices, some applications, otherwise considered as required core by many computing devices, may not be considered a required core application by other particular computing devices. What may be considered a required core application can depend on a wide variety of factors, including, but not limited to, device architecture, the types of operator provided applications, user desired applications and preferences, and the like. As a result, a particular core application may be present on a particular computing device but may never in fact actually executed by such computing device. Such non-used/non-required core applications waste valuable resources by further constraining the already severely resource constrained environment by unnecessarily consuming additional resources. This situation is particularly acute where the core application at issue is large in size.

OEM/ASIC Revenue Models

Typically, when ASIC manufacturers provide ASIC chips to OEMs, the ASIC manufacturers receive only a one time initial revenue payment amount (corresponding to a revenue receivable and a corresponding revenue payable) for the associated chips (and the functionality thereon) from the OEMs. This includes ASIC chips that include preloaded core applications. Currently ASIC manufacturers have little ability to generate revenue payments beyond the initial one time initial revenue payment amount since the ASIC chips generally contain all the active functionality that they will ever contain at time of delivery. Although an ASIC manufacturer may be able to modify the type of functionality available on the ASIC chip immediately prior its delivery, this does not change the fact that such manufacturers revenue is typically tied directly to the one set of active functionality available at the time of delivery. Because the preloaded active functionality available on the chip typically remains static once delivered, the ASIC manufacturer is therefore only currently capable of receiving the one time revenue payment related to such ASIC chip. Therefore, because of the static nature of the functionality provided by ASIC manufacturers, such ASIC manufacturers are precluded any additional revenue beyond the single one time revenue payment for each of their shipped ASIC chips.

Similarly, when OEMs provide computing devices to consumers, OEMs typically only receive a one time initial revenue payment (associated with a revenue receivable and a corresponding revenue payable) for the associated computing devices (and the functionality thereon). This includes computing devices that include preloaded core applications. Currently OEMs have little ability to generate revenue payments beyond the initial one time initial revenue payment amount since the computing devices generally contain all the active functionality they will ever contain at the time of delivery. Although an OEM may be able to load additional applications on the device immediately prior to its delivery, this does not change the fact that such manufacturer's revenue is tied directly to the one set of active functionality available at the time of delivery. Because the preloaded active functionality available on the computing device remains static once delivered, the OEM is therefore only currently capable of receiving the one time revenue payment related to the computing device. Therefore, because of the static nature of the functionality provided by the OEMs, such OEMs are precluded any additional revenue beyond the single one time revenue payment for each of their shipped computing devices.

There is therefore a need in the art for the ability to preload core applications in an inactive mode. With the introduction of the ability to preload inactivated core applications also comes a need in the art for the ability to activate such preloaded inactivated core applications. Also, with the introduction of the ability to preloaded inactivated core applications also comes a need to remotely activate such preloaded inactivated core applications. Also, with the introduction of the ability to preloaded inactivated core applications also comes a need to hide the presence of such applications prior to their activation. There is therefore also a need in the art to provide the ability for OEMs and ASIC manufacturers to realize revenue receivables after an initial sale of a product by providing the ability to activate dormant functionality in such products after the delivery of such products. There is also a need in the art to provide $3^{rd}$ parties, such as OEMs and ASIC manufacturers the ability to track usage of core applications after delivery of computing devices to an end user. There is therefore also a need in the art to selectively provide core applications without having to preload different sets of core applications for different users. There is also a need in the art to limit overall system activity by requiring computing devices, rather than server devices, to initiate requests to activate additional core application functionality on such computing devices.

SUMMARY

Embodiments disclosed herein address the above stated needs including, for example, one or more embodiments, in which methods, software and apparatus, are used to remotely activate resident core dormant applications. In at least one embodiment, methods, software and apparatus are operable to detect, on a computing device, a preloaded inactivated core application. In response, such embodiment(s) are operable to detect the preloaded inactivated core application and send an activation inquiry request requesting an activation status associated with the preloaded inactivated core application. The activation inquiry request is sent over a network. At least one of the embodiment(s) is operable to further receive the activation status associated with the preloaded inactivated core application.

In at least one embodiment, methods, software and apparatus are used to receive, via a network, an activation inquiry request requesting an activation status associated with a preloaded inactivated core application, where the activation inquiry request is received on a remote computing device. At least one embodiment is operable to determine the activation status based on information associated with the remote computing device, and where such information stored remotely from the remote computing device. At least one embodiment is operable to send, via a network, the activation status.

In at least one embodiment, methods, software and apparatus are used to detect, on a computing device, a preloaded inactivated core application. Such embodiment(s), in response to detecting the preloaded inactivated core application, are operable to send, via a network, an activation inquiry request requesting an activation status associated with the preloaded inactivated core application. The embodiment(s) are operable to receive the activation inquiry request requesting an activation status associated with the preloaded inactivated core application on the computing device, where the activation inquiry request is received via a network at a server. The embodiment(s) are also operable to determine the activation status associated with the preloaded inactivated core application based on information associated with the computing device, where the information is stored remotely from the remote computing device. The embodiment(s) are also operable to send the activation status to the computing device via a network. The embodiment(s) are further operable to receive the activation status associated with the preloaded inactivated core application at the computing device, via a network.

In at least one embodiment, methods, software and apparatus, includes a preloaded inactivated core application. At least one of such embodiments includes logic configured to detect the preloaded inactivated core application. Also, at least one of such embodiments further includes logic configured to generate and send, via a network, an activation inquiry request requesting an activation status associated with the preloaded inactivated core application. At least one of such embodiments includes logic configured to receive, via a network, and process the activation status associated with the preloaded inactivated core application.

In at least one embodiment, methods, software and apparatus, includes an integrated circuit chip having a preloaded inactivated core application. At least one of such embodiments includes logic configured to allow for the activation of the preloaded inactivated core application after the integrated circuit chip has been installed in a computing device.

In at least one embodiment, methods, software and apparatus, includes logic configured to receive, via a network, an activation inquiry request requesting an activation status associated with a preloaded inactivated core application on a remote computing device. At least one of such embodiments include logic configured to determine the activation status based on information associated with the remote computing device, the information stored remotely from the remote computing device. Also, at least one of such embodiments include logic configured to send, via a network, the activation status.

In at least one embodiment, methods, software and apparatus, includes a computing device including a preloaded inactivated core application. At least one of such embodiments further includes logic configured to detect the preloaded inactivated core application. Also, at least one of such embodiments further includes logic configured to generate and send an activation inquiry request requesting an activation status associated with the preloaded inactivated core application. At least one of such embodiments include logic configured to receive and process an activation status associated with the preloaded inactivated core application. In addition, at least one embodiment includes a server including logic configured to receive the activation inquiry request requesting an activation status associated with the preloaded inactivated core application on the computing device. At least one of such embodiments include logic configured to determine the activation status based on information associated with the computing device, the information stored remotely from the computing device. Also, at least one of such embodiments include logic configured to send the activation status to the computing device.

In at least one embodiment, methods, software and apparatus, includes code operable to detect, on a computing device, a preloaded inactivated core application. At least one of such embodiments include code operable to send, via a network, and in response to the detecting of the preloaded inactivated core application, an activation inquiry request requesting an activation status associated with the preloaded inactivated core application. Further, at least one of such embodiments include code operable to receive, via a network, the activation status associated with the preloaded inactivated core application.

In at least one embodiment, methods, software and apparatus, includes code operable to receive, via a network, an activation inquiry request requesting an activation status associated with a preloaded inactivated core application on a remote computing device. At least one of such embodiments also includes code operable to determine the activation status based on information associated with the remote computing device, the information stored remotely from the remote computing device. In addition, at least one of such embodiments further includes code operable to send, via a network, the activation status.

At least one advantage of at least one embodiment includes removing the need for users to download certain applications. Another advantage is the removal of the long post-delivery download delays associated with the downloading of certain applications. Another advantage is the elimination of technical aspects associated with the post-delivery downloading of applications otherwise associated with complex hardware interfaces.

At least one advantage of at least one embodiment includes the ability for either OEM's or ASIC manufacturers to selectively optionally download particular applications in an inactivated state. Further, this ability for OEM's & ASIC manufacturers to load inactivated applications facilitates many of the other advantages described throughout this document.

At least one advantage of at least one embodiment includes the ability to remotely activate applications that were originally provided in a device in an inactivated state. Another advantage is the ability to selectively hide the presence of a preloaded inactive application from the user until a point in time, if any, when it may be deemed desirable to prompt the user with activation related information. For example, in at least one embodiment the user is not prompted with activation related information unless an associated license for such device/application indicates that any use of such application requires the input of the user indicating a directive to activate the particular application.

At least one advantage of at least one embodiment includes the ability for OEMs and ASIC manufacturers to realize large market shares associated with products having limited functionality (i.e., products with inactivated applications at the time of delivery), while at the same time introducing potential for previously unavailable post-delivery revenues associated with products having increased functionality (i.e., products with inactivated applications that are capable of being activated after delivery).

At least one advantage of at least one embodiment includes the ability to eliminate the need for the delivery to a wide variety of devices, of certain core applications in an activated state, where there exists a certain subset of such wide variety of devices for which such core applications are not required. For example, such core applications may be delivered in an inactive state for the wide variety of devices, and only those devices that require such core applications need activate such applications after the delivery of such devices.

At least one advantage of at least one embodiment includes the ability to shift the initiation of the activation for a particular preloaded application to the post-delivered computing device rather than to the pre-delivered computing device. Therefore, the amount of activity associated with activating the preloaded core applications on the overall population of devices is limited to only those devices for which activation is desired and the remaining devices need not be considered in any activation process for such associated preloaded core applications, including any remote contact or polling that might be attempted with respect to such devices.

Other aspects, advantages, and features of the present invention will become apparent after review of the entire application, including the following, sections: Brief Description of the Drawings, Detailed Description, and the Claims.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

Figure 1:
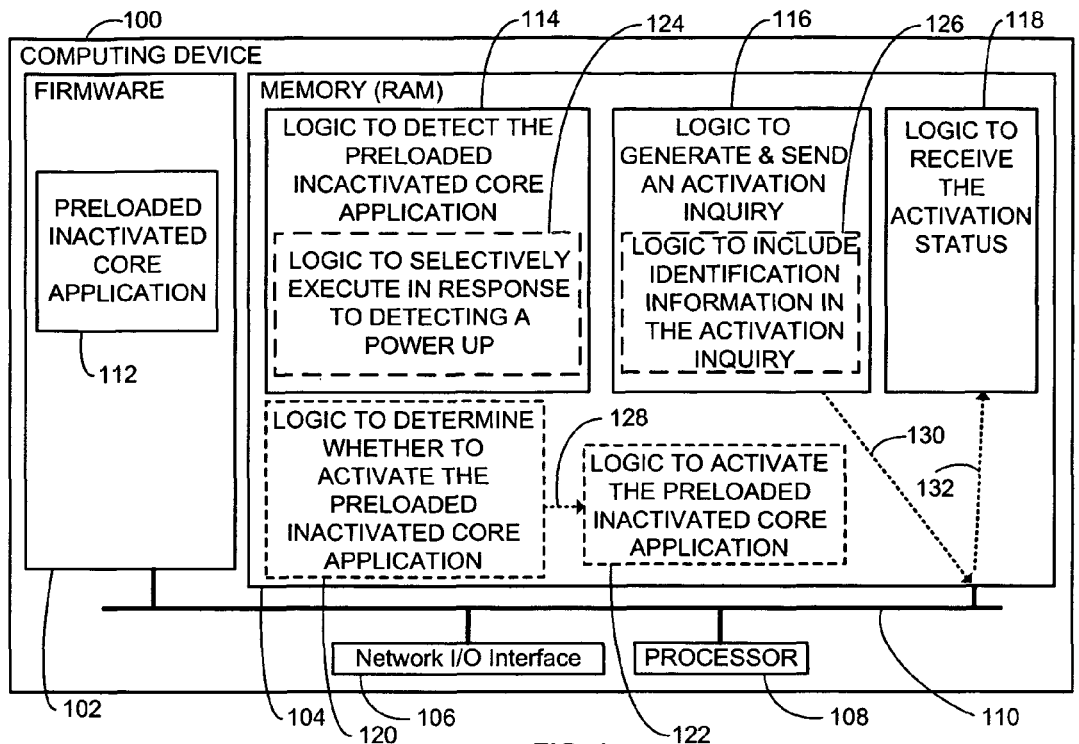
FIG. 1 shows one embodiment of a computing device operable to activate applications on a computing device.

The word "exemplary" is used herein to mean "serving as an example, instance, or illustration." Any embodiment described herein as "exemplary" is not necessarily to be construed as preferred or advantageous over other embodiments. Further, many embodiments are described in terms of sequences of actions to be performed by, for example, elements of a computing device. It will be recognized that various actions described herein could be performed by specific circuits (e.g., application specific integrated circuits (ASICs)), by program instructions being executed by one or more processors, or by a combination of both. Further, the embodiments described herein can additionally be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform a certain action or "code operable to" perform the described action.

This detailed description describes methods, software and apparatus used in a process of activating preloaded inactivated core applications on a computing device, including methods, software and apparatus, for detecting a preloaded inactivated core application on a computing device, sending an activation inquiry request requesting an activation status associated with the preloaded inactivated core application, and receiving the activation status. In at least one embodiment, the computing device has an embedded controller and limited resources (i.e., limited display area, memory capacity, file system space, amount of input and output capabilities and processing capability). Further, one ore more embodiments include as the corresponding computing device computing devices such as: portable wireless telephones, personal digital assistants (PDAs), and paging devices that are each relatively small and lightweight such that the computing device can be easily carried by a user.

In one or more embodiments, the system used to activate applications on a computing device interacts with a runtime environment executing on the computing device where the runtime environment is used to simplify operation of the device, such as by providing generalized calls for device specific resources, and to provide activation functionality on the device as described herein. One example of such a runtime environment is the Runtime Environment for Wireless® (BREW®) software platform developed by QUALCOMM, Inc., of San Diego, Calif. In the present description, it will be assumed that the system used to execute and activate applications on the computing device is implemented on a portable device executing a runtime environment, such as the BREW® software platform. However, one or more embodiments of the system used to execute and activate applications on the computing device are suitable for use with other types of runtime environments to control the execution of applications on such computing devices. More specifically, one example of another runtime environments that may be used to implement the features described herein, is a common personal computer design where associated engines may be modified as necessary to mimic the operations described herein, for example, such engines may be modified to always check for license-type information associated with a preloaded inactivated core application 112 before executing such application.

FIG. 1 illustrates one exemplary embodiment of a computing device operable to activate applications on a computing device 100. As used herein "computing device" includes, for example, one or more processing circuits executing resident configured logic, where such computing devices include, for example, microprocessors, digital signal processors (DSPs), microcontrollers, portable wireless telephones, personal digital assistants (PDAs), and paging devices, or any suitable combination of hardware, software and/or firmware containing processors and logic configured to at least perform the operations described herein directed to the activation of preloaded inactivated core applications.

As shown in the exemplary embodiment, the computing device 100 includes firmware 102, memory 104, network I/O interface 106, processor 108 and bus 110. Although certain applications are shown contained within what is shown as firmware 102, (a semi-permanent memory (eg., programmable read only memories (PROMS), electrical PROMS (EPROMS), etc.), other embodiments include such applications in other types of memory such as random access memory (RAM) and other memory types that provide for the storing of configured logic. Similarly, although the memory 104 is shown as RAM memory, other embodiments include such memory 104 as all types of memory that provides for the storing of configured logic. In addition, although memory 104 is shown as one contiguous unit of one type of memory, other embodiments use multiple locations and multiple types of memory as memory 104.

The network I/O interface 106 provides input and output to devices coupled to the network via the bus 110. The processor 108 operates on instructions and data provided via the bus 110. Located within firmware 102 is a preloaded inactivated core application 112. The "preloaded" aspect of the preloaded inactivated core application 112 refers to the loading of such application onto the computing device prior to the device being made available for purchase or before such device otherwise reaches the end user. The "preloaded" aspect may be achieved either indirectly, through its prior installation on an ASIC that is subsequently installed on the computing device device, or directly, by its installation directly onto the computing device itself. Therefore, to the extent that ASIC manufacturers and computing device original equipment manufacturers are typically separate entities, it can be either the ASIC manufacturer or computing device OEMs who perform the preloading of the preloaded inactivated core application 112 on the computing device 100.

The "inactivated" aspect of the preloaded inactivated core application 112 refers to the fact that such application is present on the computing device 100 in a form that is not configured to allow the execution of such application on the device without some additional further configuration or some additional set-up that allows the user of the computing device 100 to initiate execution of the preloaded inactivated core application 112. Further, in one embodiment, the computing device 100 provides no indication, (i.e., no user prompt), indicating the presence of the resident application on the computing device 100. In another embodiment the presence of the preloaded inactivated core application 112 is selectively indicated by the computing device 100, via a display or other user/interface (U/I) related component, where, for example, during a boot-up sequence the computing device 100 executes logic that displays a prompt to user with a request to activate the currently inactivated application.

The "core" aspect of the preloaded inactivated core application 112 refers to the type of application having characteristics such as, being known to being frequently called by other applications and/or performing critical functionality. If such applications were not preloaded on the computing device prior to delivery, the often used aspect of the application would almost certainly require a subsequent interactive download of such application over a network. As discussed above, core applications, in addition to being frequently called and/or providing critical functionality, are also known have other common traits, including having both large memory requirements and/or having complex hardware interfaces. Therefore, in addition to attempting to reduce the work required by users to load down what are otherwise required applications, other reasons also exist for avoiding interactive downloads such as the reason for avoiding of long post-delivery download times associated with large applications and avoiding technical related issues associated with interactive post-delivery of applications having complex hardware interfaces.

Located within memory 104 is logic configured to detect the preloaded inactivated core application 114, logic configured to generate and send an activation inquiry 116, logic configured to receive the activation status 118, optional logic configured to determine whether to activate the preloaded inactivated application 120 and optional logic configured to activate the preloaded inactivated core application 122. In one embodiment, the logic located in memory 104 is logic in the form of software programs loaded in RAM memory. In contrast, other embodiments include such logic in the form of either hardware and/or firmware or some combination of hardware, firmware and/or software.

In one embodiment, the logic configured to detect the preloaded inactivated core application 114 operates to detect the presence of the preloaded inactivated core application 114 on the computing device 100. In one embodiment such logic is performed each time the computing device is powered or booted up as represented in the optional logic to selectively execute in response to detecting a power up 124. For example, the computing device 100 may have a list of inactivated applications for which it analyzes to determine if such devices have been activated. In one embodiment, whether such computing device 100 has been activated is based on a current license status for such preloaded inactivated core application 112. Here, if such license status indicates an activated status, no further user interaction nor activation steps are required. Such license status information may be located on the device itself, or maybe stored remotely therefrom. However, if such license status indicates an inactivated status, then the process continues such that it may be determined if such preloaded inactivated core application 114 should be activated.

In one embodiment, for example, the process of whether such application should be activated is a process where the computing device prompts the user requesting an indication of whether to activate the preloaded inactivated core application 112. For example, the computing device 100 may display a prompt that requests the user select from three different pricing structures associated with different time length activations: "1 month activation for $1, 1 month activation for $1.75 or a subscription for $10.50 per month," and depending on the received response, the computing device 100 would then initiate a process to activate such preloaded inactivated core application 114 for the desired time period. Other embodiments prompt the user with different information, while yet other embodiments exclude from the activation any interaction with a user of the computing device 100.

In one embodiment, the logic configured to generate and send an activation inquiry request (130) 116 operates to request the license status from a remote location. In one embodiment, the computing device 100 includes a stored license key that is used to access the desired information from a remote location such as a remote server. One embodiment includes the optional logic to include identification information in the activation inquiry request (130) 126. Further, in one embodiment, both a specific identifier of the computing device is used along with an application identifier as identification information used to retrieve off-device information regarding the current licensing status. In one embodiment the specific identifier of the computing device is a combination of the device model and the device serial number. For example, a cellar wireless device's electronic serial number (ESN) may be used as part of the specific identifier. In another embodiment the specific identifier includes an internet protocol (IP) address. In another embodiment the specific identifier includes a phone number associated with the computing device (e.g., a wireless phone device). In another embodiment a portion of the specific identifier is retrieved from a subscriber identify module (SIM) card, or other like component, that contains subscriber-related information. In addition, in one embodiment, the application identifier is a pre-assigned identification number identifying the particular application including a version number.

In one embodiment, after processing at an off-device, or remote location, where an activation status, associated with the preloaded inactivated core application 114 for the particular computing device/billing entity, is determined, then the logic configured to receive the activation status (132) 118 operates to receive such activation status 132. In one embodiment, such activation status 132 includes license information identifying whether such preloaded inactivated core application-device (112-100) combination has a corresponding current status of either activated or inactivated. In one embodiment, license information indicating an activated status further includes specific parameters that represent a subset of functions, actions or features that are specifically activated. In such embodiment such parameters include, for example, when such application can be run, how many times the application can be run, limitations associated digital rights management generally and other like limitations and functions known to be associated with applications generally.

In one embodiment the activation status 132 is received from a remote location. In one embodiment this remote location is located on a network that is coupled to the computing device 100. In one embodiment the network is a wireless network and the computing device 100 is a wireless device. In one embodiment the wireless device is a wireless cellular device supporting voice and data operations. In addition, other different embodiments include as the computing device 100, for example, a computing device 100 that is small, lightweight, and can be easily carried by a user, including: wireless telephones, personal digital assistants (PDAs), and paging devices.

In one embodiment, after performing the logic configured to receive the activation status (132) 118, then logic to determine whether to activate the preloaded inactivated core application (112) 120 is executed. In one embodiment, the contents of the activation status 132 is examined to determine if the preloaded inactivated core application-device (112-100) combination is currently allowed or licensed to be activated. In one example the logic configured to receive the activation status (132) 118 further includes logic to confirm whether a digital signature associated with license information contained within the activation status is valid before determining that the preloaded inactivated core application-device (112-100) combination should be activated.

In one embodiment, after performing the logic to determine whether to activate the preloaded inactivated core application 120, and in response to determining that the preloaded inactivated core application 112 should be activated via signal 128, then logic to activate the preloaded inactivated core application 122 is executed.

In one embodiment, any activation, or request for activation, of preloaded inactivated core applications 112 generated from the computing device 100 are monitored and recorded such that tracking of usage of such preloaded inactivated core applications 112 can be subsequently or concurrently monitored. This functionality allows for the monitoring of the use of core applications by $3^{rd}$ parties, such as ASIC manufacturers and OEMs, who have heretofore had little to no means for tracking such usage of core applications.

In one embodiment, the activation of such preloaded inactivated core applications 112 is associated with the generation of revenue and an associated payment. In one embodiment, at least a portion of the revenue is ultimately provided to at least one entity associated with such application. For example, if the preloaded inactivated core application 112 was loaded onto the device by an OEM, the OEM receives a portion of the revenue. If the preloaded inactivated core application 112 was loaded into an ASIC by the ASIC manufacturer, then such manufacturer receives a portion of the revenue. Further, as chosen in some embodiments, all or part of such revenue is provided to other $3^{rd}$ parties such as network operators including cellular network operators, network service providers, and other parties that play some sort of role in the process of facilitating the delivery or use of the application on a remote computing device 100. Among other aspects, the functionality described above allows for the generation of revenue by $3^{rd}$ parties, such as ASIC manufacturers and OEMs, who have heretofore had little or no means for receiving revenue streams associated with a product that had already been sold and shipped.

In addition, some of those embodiments that include such preloaded inactivated core applications 112 may also provide functionality that allows for the removal and/or replacement of such applications. For example, where it is determined that such preloaded inactivated core application 112, needs to be upgraded to a new version, a coupling of the computing device 100 with a remote network device may cooperate to replace the current preloaded inactivated core application 112 with a new preloaded inactivated core application 112. Again, because of certain common features of core applications, such as file size and/or input/output complex functionality, the time required to perform such an upgrade over a network with a remote network device, may be substantial compared to the loading or upgrading of non-core applications. However, the complications introduced by the loading of such core applications, e.g., upgrades thereof, may be very desirable when compared to alternatives such as having to physically return such devices to a retailer or manufacturer so that the device can serviced on-site.

Further, in some embodiments, the operation of the upgrading or loading of a new version of the preloaded inactivated core application 112 is performed similar to much of the operation described herein. Specifically, such operation includes the generation of a request at the computing device 100 for the activation of the preloaded inactivated core application 112, where it is the computing device 100 that generates such request. In contrast, some embodiments include the driving of upgrading of core applications (or even their activation) from a remote location. For example, a remote server 200 that has a list of computing devices 100 on the network may operate to allow for all or a portion of such computing devices 100 to receive the delivery of a new version of the preloaded inactivated core application 112 without such computing devices 100 being the entities what initially generate the initial contact with the remote server 200. In, some embodiments, an approval message must be first received by the computing device 100 before any such download and/or activation of such upgraded application occurs.

Figure 2:
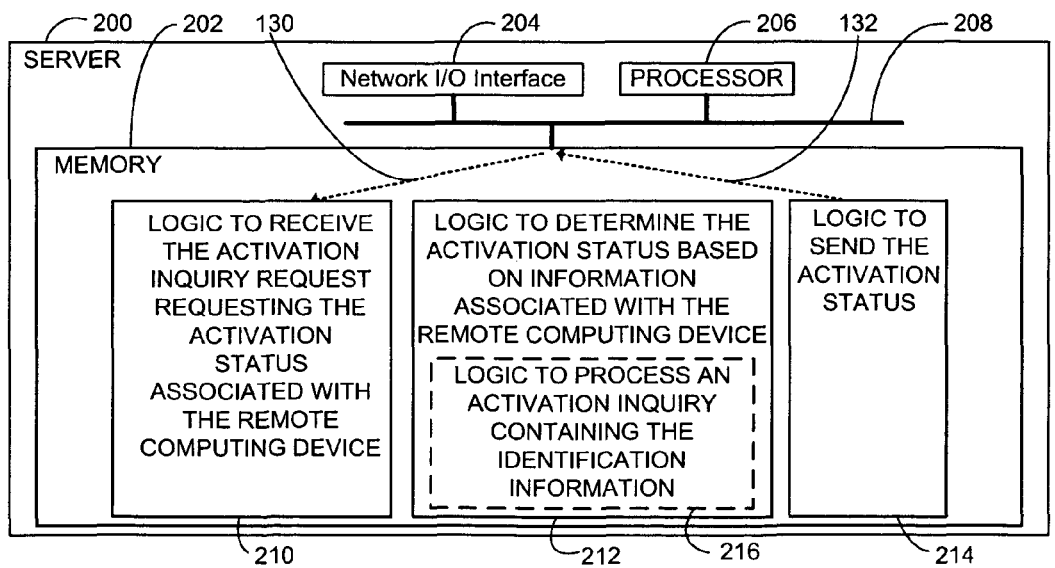
FIG. 2 shows one embodiment of a server operable to activate applications on a computing device.

FIG. 2 illustrates one exemplary embodiment of a server operable to activate applications on a computing device 100. As used herein "server" includes, for example, logic executing on a computing device which provides a service to other logic executing on the same or separate computing device 100. In one embodiment, the server 200 includes logic operating on a separate computing device from a client computing device 100 and is coupled to the client computing device 100 over a network. In one embodiment such network is, at least in part, a wireless network. In such embodiment the server 200 provides the service of providing the activation status 132 associated with the preloaded inactivated core application 112 in response to receiving an activation inquiry request 130 from the computing device 100.

As shown in the exemplary embodiment, the server 200 includes memory 202, network I/O interface 204, processor 206 and bus 208. Although the memory 202 is shown as one contiguous unit of RAM, other embodiments use multiple locations and multiple types of memory as memory 202. The network I/O interface 204 provides input and output to devices coupled to the network via the bus 208. The processor 206 operates on instructions and data provided via the bus 208. Located within memory 204 is logic to receive the activation status 132 associated with the remote computing device 210, logic configured to determine the activation status 132 based on information associated with the remote computing device 212, and logic configured to send the activation status (132) 214, and.

In one embodiment, the logic configured to determine the activation status 132 based on information associated with the remote computing device 212 operates by using the information associated with the remote computing device to look-up, in a database, table or other data structure, whether the preloaded inactivated core application 112 is indicated as having an activation status 132 or license that show that such application should be activated on the remote computing device. In one embodiment it is a unique device identifier in conjunction with a preloaded inactivated core application identifier that is used to uniquely identify whether to generate a corresponding activation status 132 that indicates that such application should be activated for such remote computing device.

In one embodiment such database is located locally on the server 200. In other embodiments the database is located remotely from the server 200. In one embodiment the logic configured to determine the activation status 132 based on information associated with the remote computing device 212, further contains optional logic to process an activation inquiry request 130 containing the identification information 216. In such embodiment, the information associated with the remote computing device 210 is contained within the activation inquiry request 130 sent by a remote computing device.

In one embodiment, the logic configured to send the activation status (132) 214 operates to send the activation status 132 to the remote computing device in response to receiving such activation status from the logic configured to determine the activation status 132 based on information associated with the remote computing device 212. In one embodiment the activation status 132 contains a digital signature for use by the receiving remote computing device verify the contents are from the sender and that the contents have not been modified from the original. In one embodiment the activation status 132 is sent via over a wireless network to the remote computing device.

Figure 3:
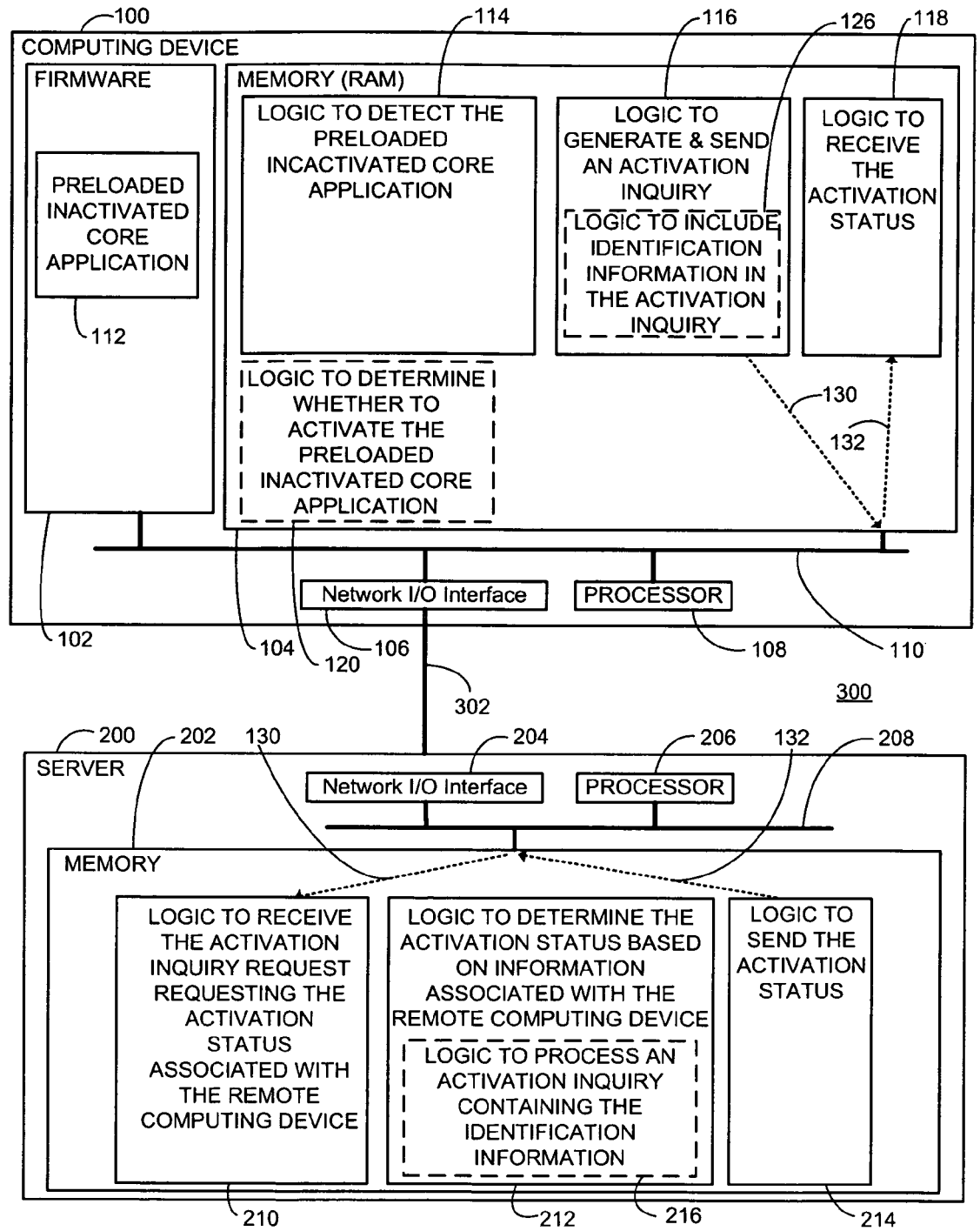
FIG. 3 shows one embodiment of a system operable to activate applications on a computing device.

FIG. 3 illustrates one exemplary embodiment of a system 300 operable to activate applications on a computing device 100. Here, the embodiment shown includes a network 302 through which the computing device 100 and a server 200 are operably coupled. In one embodiment the network 302 is a wireless network. In one embodiment the network 302 is a cellular wireless network. In another embodiment the network 302 is a wireless cellular network handling both voice and data transmissions. In one embodiment the network 302 provides a conduit for the transmission of data between the computing device 100 and the server 200 including, for example, the activation inquiry request 130 and the activation status 132.

As shown, the computing device 100 is substantially similar to the computing device of FIG. 1, absent the specific optional logic configured to activate the preloaded inactivated core application (112) 122 and the specific optional logic to selectively execute in response to detecting a power up 124 of the computing device 100. Although the embodiment of system 300 shown in the current figure is absent such logic, other embodiments include such logic and yet other embodiments include or exclude other logic present or not present in FIG. 1. Also, as shown, the server 200 is substantially similar to the server shown in FIG. 2, although other embodiments of server 200 contain variations not shown in such figure.

Figure 4:
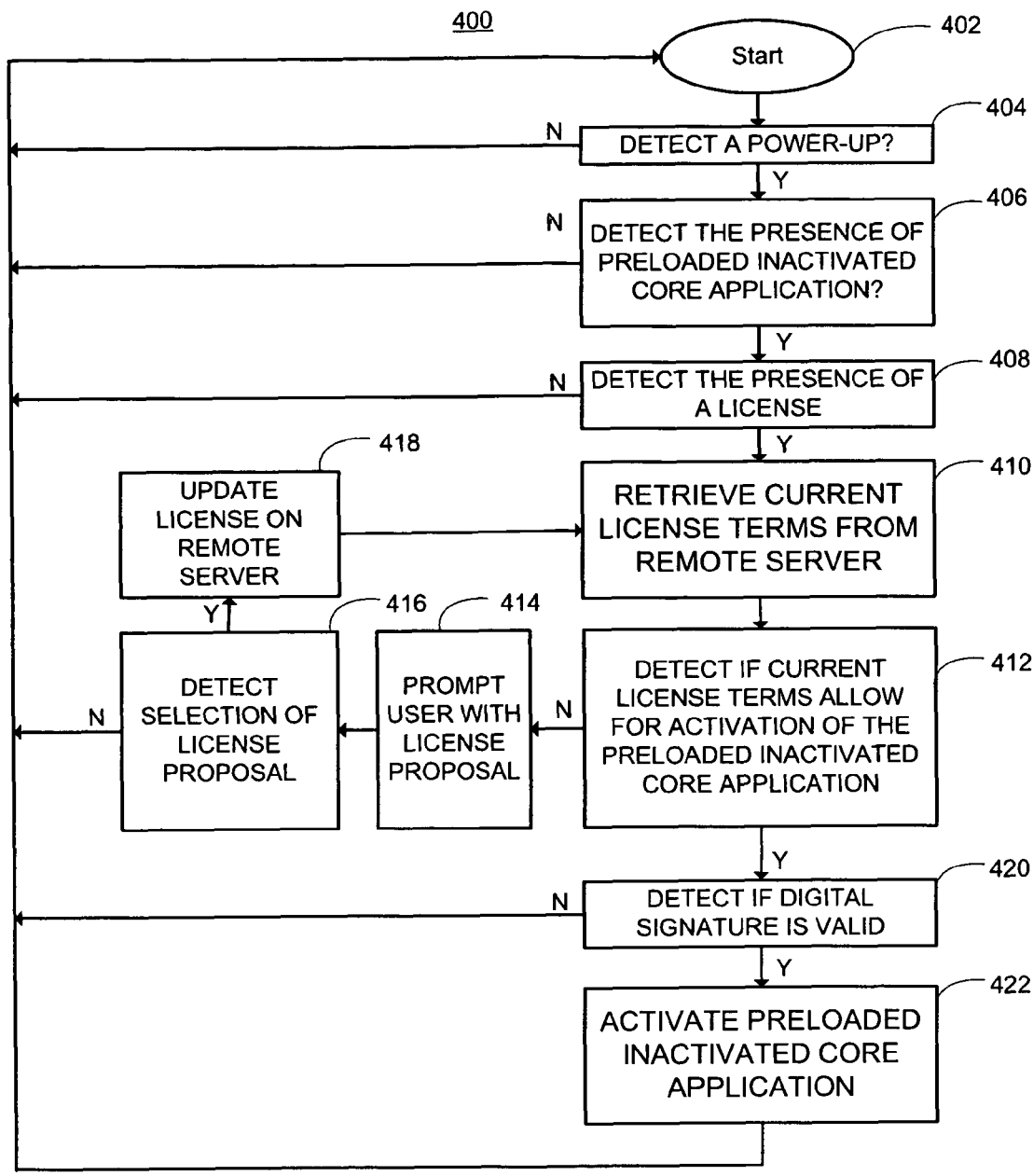
FIG. 4 shows one embodiment of a method to activate applications on a computing device.

FIG. 4 illustrates one exemplary embodiment of a method 400 of activating applications on a computing device 100. Method 400 begins at start step 402. In one embodiment the process continues with step 404 where a computing device 100 monitors such device for the detection of a power up of such device. In response to the detection of such a power up, in step 404, is the execution of a step 406 that attempts to detect the presence of a preloaded inactivated core application 112. In contrast, other embodiments detect the presence of the preloaded inactivated core application 112 at other times and in response to other activity, for example, in one embodiment such attempted detections are performed at specified time intervals.

If, at step 406, there is an absence of a detection of the preloaded inactivated core application 112, then the process is reinitialized for the next detection of a power up of the computing device 100. If however step 406 results in the detection of the presence of a preloaded inactivated core application 112, then the process continues on to step 408 where the detection of the presence of an up-to-date and valid license for the corresponding computing device-application (100-112) combination is performed. In one embodiment valid license information is first sought from the computing device 100 before continuing to look for specific up-to-date terms from a remote location. Other embodiments utilize other methods to uniquely identify (specific identifier) a given request for use of an application such that it can be remotely determined, (i.e., at a server), whether a valid license exists for the particular requested use of the preloaded inactivated core application 112. As such, at least a portion of such identifier can be an IP address, phone number, SIM card, or the like.

Following step 408 is step 412 which includes the detection of whether the current retrieved license terms allow for the activation of the preloaded inactivated core application 112. If the current license terms do not allow for the activation of the preloaded inactivated core application 112, then a sub-process (see steps 414, 416 and 418) is performed to potentially expand current license terms depending upon the response by the user.

The sub-process embodied in steps 414, 416 and 418 include the initial step 414 in which the computing device 100 displays a prompt requesting a response as to whether a license is desired that would allow for the activation of the preloaded inactivated core application 112. In one embodiment, multiple selections are provided such that any one of a number of responses may be detected where each such response corresponds to different license terms. In step 416 the computing device 100 detects the particular selection of a user (e.g., the detection of the press of a keypad button corresponding to the number "1" corresponding to particular license terms.) If a selection of an option to reject all proposed license terms is detected, then the method 400 is reinitialized back to step 402. If, however, a selection of new proposed license terms is detected, then the process continues onto step 418 where the stored license terms (or the lack thereof) on the remote server are updated to reflect the newly requested license terms. In other embodiments the updated license terms are stored on the computing device 100. In the embodiment shown, the process returns to step 412. However, other embodiments move directly to step 420.

If, at step 412, the current license terms allow for the activation of the preloaded inactivated core application 112, then the process moves to step 420 where a digital signature associated with the license information, or activation status 130, is examined to determine if the signature is valid. If the signature is not valid, the process is abandoned such that the process returns to the first step 402. In other embodiments, if the signature is determined to not be valid, the process returns to other steps in the process other than step 402. In other embodiments, additional steps, not shown, are followed in response to determining a signature is not valid, such as requesting user input in response to such a result, or attempting to retrieve the license information again in an attempt to end up with a valid associated digital signature. If the digital signature is determined to be valid in step 420, then the step of activating the preloaded inactivated core application 112 is then performed. Once activated the preloaded inactivated core application 112 may be executed like any other active or activated application present on the computing device 100. Once the preloaded inactivated core application 112 is activated in step 422 the process begins anew at the starting step 402.

Figure 5:
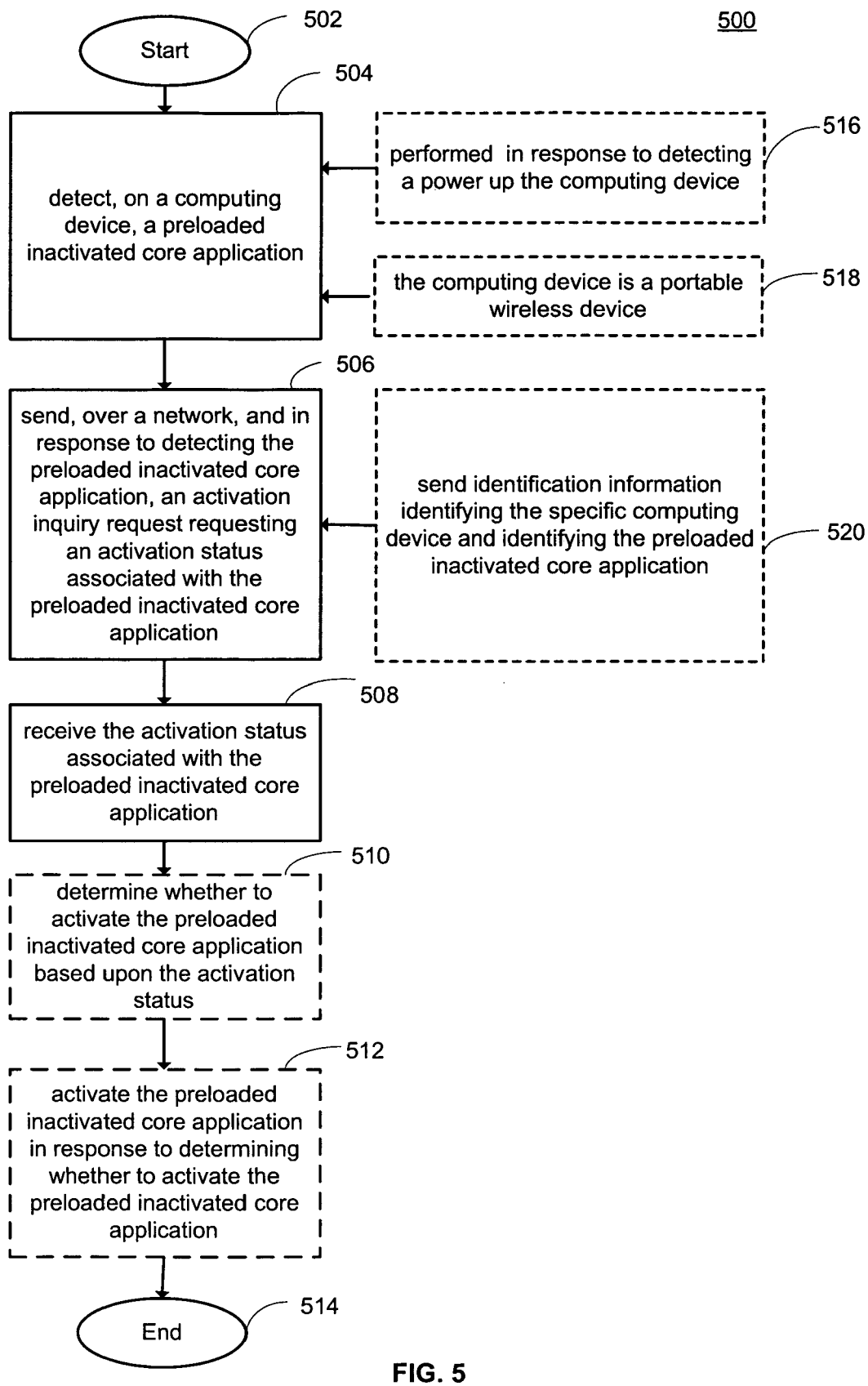
FIG. 5 shows one embodiment of a method to activate applications on a computing device.

FIG. 5 illustrates one exemplary embodiment of a method 500 of activating applications on a computing device 100. Specifically, FIG. 5 describes a method 500 where, after the starting step 502, the process performs a step 504 to detect, on a computing device 100, a preloaded inactivated core application 112. Following step 504 is step 506 to send, over a network 302, and in response to detecting the preloaded inactivated core application 112, an activation inquiry request 130 requesting an activation status 132 (e.g., license terms) associated with the preloaded inactivated core application 112. In step 508, following step 506, the method 500 operates to receive the activation status 132 associated with the preloaded inactivated core application 112.

Shown as optional steps following step 508 are optional steps 510 and 512. In step 510 the method 500 operates to determine whether to activate the preloaded inactivated core application 112 based upon the activation status 132. Next, in step 512, the method 500 operates to activate the preloaded inactivated core application 112 in response to determining whether to activate the preloaded inactivated core application 112. Depending which embodiment is at issue, the ending step 514 follows any one or more of the steps 508, 510 and/or 512.

Additional limitations to step 504 are indicated with reference numbers 516 and 518. Reference number 516 indicates a limitation where step 504 is limited to being performed in response to detecting a power up of the computing device 112. Reference number 518 represents a limitation where the computing device 100 is a portable wireless device. In addition, optional limitation 520 is shown limiting step 506 such that the process sends identification information identifying the specific computing device 100 and identifying the preloaded inactivated core application 112.

Figure 6:
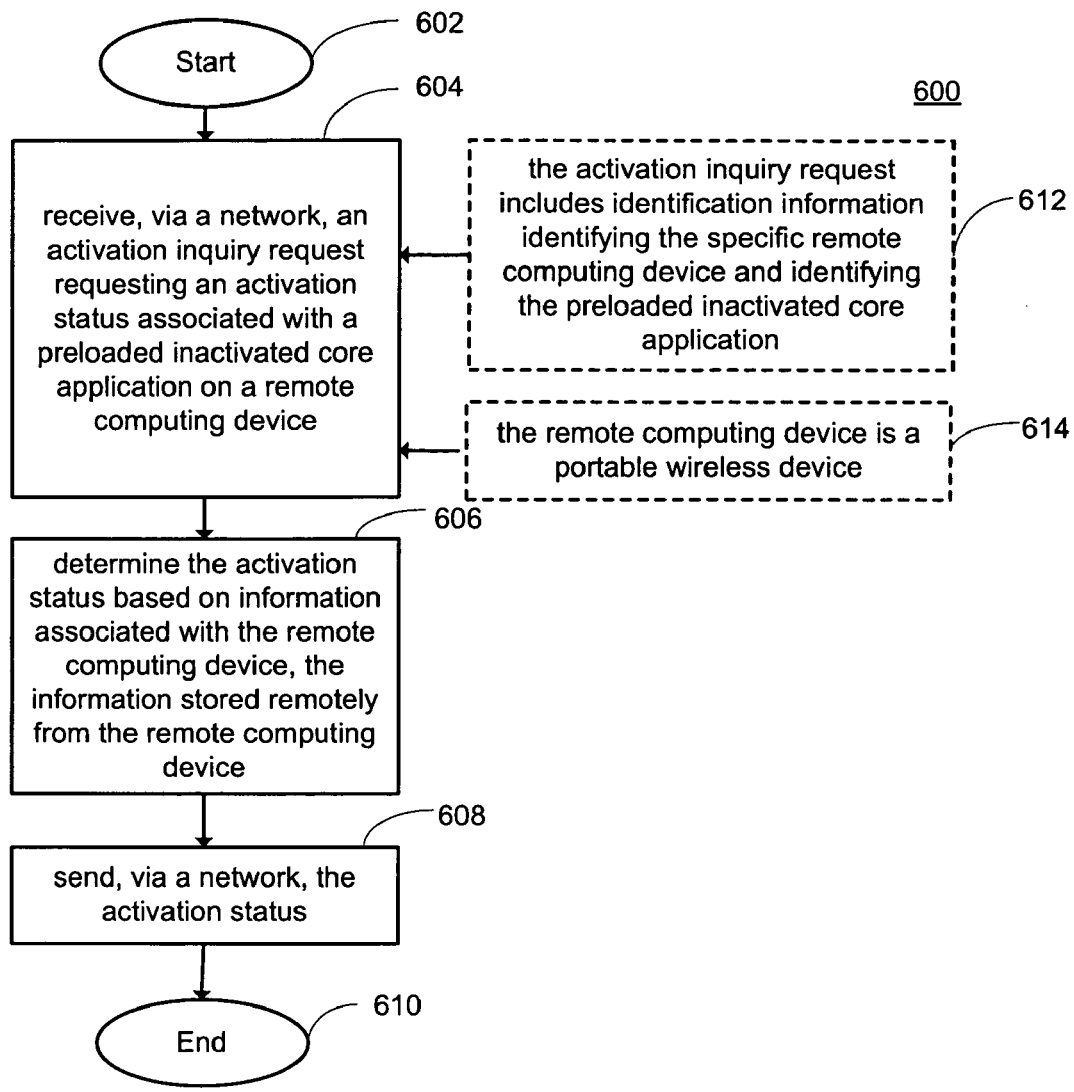
FIG. 6 shows one embodiment of a method to activate applications on a computing device.

FIG. 6 illustrates one exemplary embodiment of a method 600 of activating applications on a computing device 100. Specifically, FIG. 6 describes a method 600 where, after the starting step 602, the process performs a step 604 to receive, via a network 302, an activation inquiry request 130 requesting an activation status 132 associated with a preloaded inactivated core application 112 on a remote computing device 100. Following step 604 is step 606 where the process operates to determine the activation status 132 based on information associated with the remote computing device 100, the information stored remotely from the remote computing device 100. Next, following step 606 is step 608 where the process operates to send, via a network 302, the activation status 132, containing, for example, license information. Once step 608 is performed, the ending step 610 is performed to end the operation of method 600.

Also, limitations to step 604 are also shown in the figure. Reference number 612 indicates a limitation to step 604 such that the activation inquiry request 130 includes identification information identifying the specific remote computing device and identifying the preloaded inactivated core application 112. Further, reference number 614 indicates a limitation to step 604 such where the remote computing device 100 is a portable wireless device.

Figure 7:
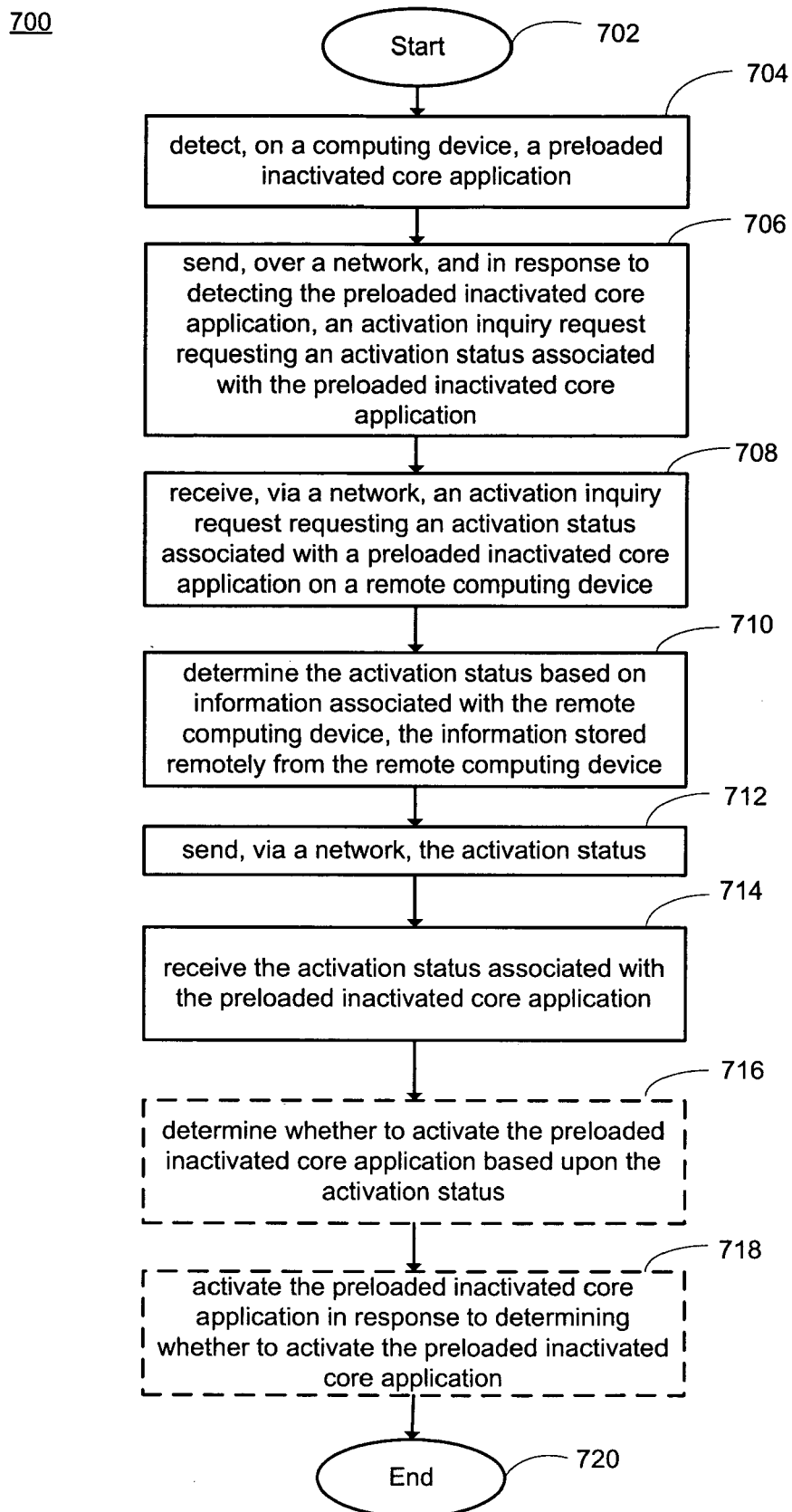
FIG. 7 shows one embodiment of a method to activate applications on a computing device.

FIG. 7 illustrates one exemplary embodiment of a method 700 of activating applications on a computing device 100. Specifically, FIG. 7 describes a method 700 where, after the starting step 702, the process performs a step 704 to detect, on a computing device 100, a preloaded inactivated core application 112. Next, step 706 denotes where the process operates to send, over a network 302, and in response to detecting the preloaded inactivated core application 112, an activation inquiry request 130 requesting an activation status 132 associated with the preloaded inactivated core application 112. Following step 706 is step 708 in which the process operates to receive, via a network 302, an activation inquiry request 130 requesting an activation status 132 associated with a preloaded inactivated core application 112 on a remote computing device 100. Step 710 follows step 708 where the process operates to determine the activation status 132 based on information associated with the remote computing device 100, the information stored remotely from the remote computing device 100. Next, step 712 operates to send, via a network 302, the activation status 132. Following step 712 is step 714 where the process operates to receive the activation status 132 associated with the preloaded inactivated core application 112.

Following step 714 are the two steps 716 and 718 that are each optional. Step 716 represents where the process operates to determine whether to activate the preloaded inactivated core application 112 based upon the activation status 132. Finally, step 718 indicates where the process operates to activate the preloaded inactivated core application 112 in response to determining whether to activate the preloaded inactivated core application 112. Depending on which embodiment of the process 700 is implemented, the ending step 720 follows any one or more of steps 714, 716 and 718.

Figure 8:
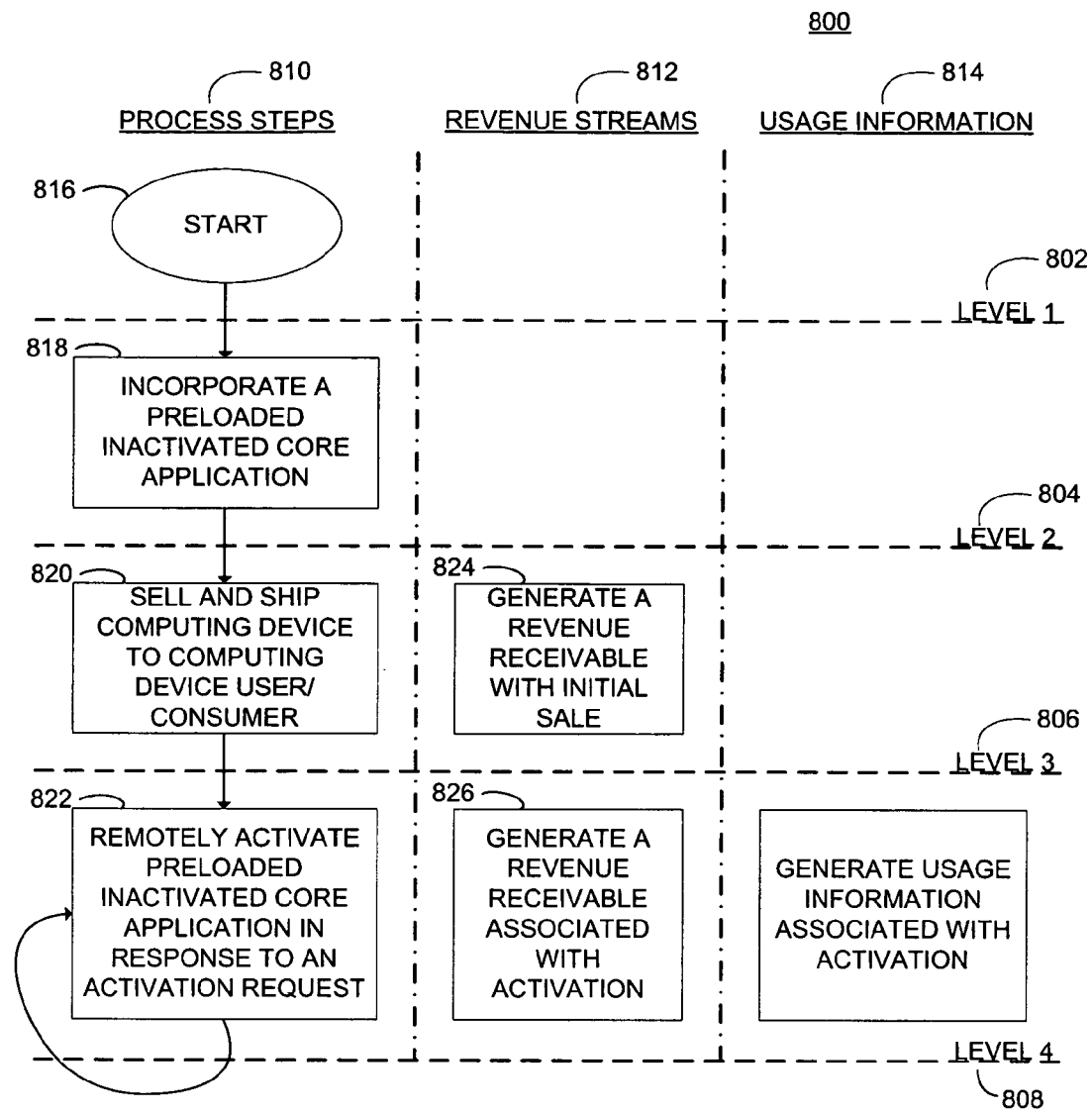
FIG. 8 shows one embodiment of a method of generating revenue associated with the sale of a computing device.

FIG. 8 illustrates one exemplary embodiment of a method 800 of generating revenue associated with the activation of an application on a computing device 100. Method 800 is shown broken into four levels (Level 1 (802), 2 (804), 3 (806) and 4 (808)) with three types of categorized functionality (process steps 810, revenue streams 812 and usage information 814). The different levels represent different steps including the corresponding activity associated with each different functionalities (810, 812 and 814) for each level (802, 804, 806 and 808). The process steps 810, as reflected in the corresponding column, reflects the functionality of the physical steps associated with the method 800. For example, step 816 represents the step of beginning the process of method 800. Step 818 reflects the incorporation of the preloaded inactivated core application 112 into either an ASIC chip and/or into the computing device 100. Step 820 reflects the sale and/or shipment of the computing device containing the computing device 100 (or just the ASIC chip) with the preloaded inactivated core application 112. Step 822 reflects the subprocess of remotely activating preloaded inactivated core application 112 in response to the detection of a request for such an activation. As shown, in one embodiment, the functionality of step 822 may be repeated for as many times as the preloaded inactivated core application may be activated. In one embodiment the preloaded inactivated core application 112 is activated every time the computing device 100 is booted up and where current parameters reflect the current activation for the computing device-application combination. In another embodiment an initial activation occurs at a first boot-up time and is only activated again on a periodic basis when a current activation is detected to have expired.

The revenue streams 812 column includes, in level 3 806 for example, and in association with the process step of 820, the generation of a revenue receivable associated with the initial sale of the computing device (and/or ASIC chip) and which corresponds to step 824. Here, the revenue receivable represents a revenue amount owed in conjunction with the sale of the computing device 100 having a preloaded inactivated core application 112. For example, a seventy five U.S. dollar charge may have been incurred in conjunction with the sale of the computing device 100 having a preloaded inactivated core application 112. Here, the seventy five U.S. dollar amount is considered both a revenue receivable to the entity for which it is owed, and a revenue payable from the entity for which owes the amount. For example, a computing device OEM may be the party for which the revenue receivable is due, and the personal wireless phone consumer may be the party that owes the corresponding revenue payable.

The revenue stream 812 column also includes, in level 4 808 for example, and in association with the process step of 822, the generation of a revenue receivable associated with the activation of the preloaded inactivated core application 112 and which corresponds to step 826. Here, the revenue receivable represents a revenue amount owed in conjunction with the activation of the preloaded inactivated core application 112. For example, a five U.S. dollar charge may have been incurred in conjunction with the activation of the preloaded inactivated core application 112 on the computing device 100. Here, the five U.S. dollar amount is considered both a revenue receivable to the entity for which it is owed, and a revenue payable from the entity for which owes the amount. For example, a computing device OEM may be the party for which the revenue receivable is due, and the personal wireless phone consumer may be the party that owes the corresponding revenue payable.

The usage information 814 column includes, in level 4 808, and in association with the process step of 822, the generation of usage information associated with the activation. Here, the usage information includes, for example, what entity activated the application, at what time it was activated and the duration of the activation (or licensed term), etc. Such information, and other like information, may be made available to OEMs, ASIC manufacturers, and other entities potentially interested in the recorded activity (or the lack thereof) associated with a particular preloaded inactivated core application 112.

Figure 9:
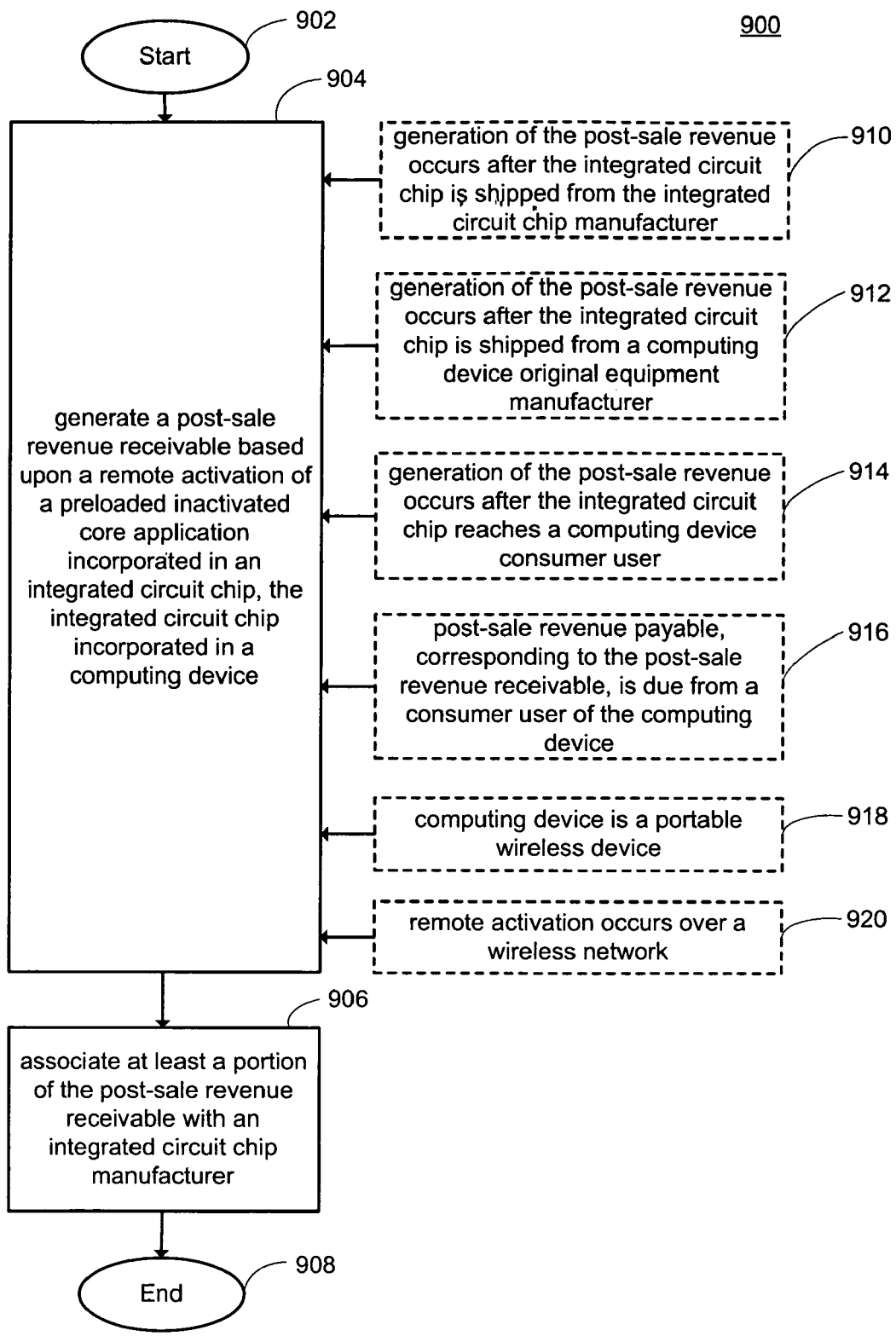
FIG. 9 shows one embodiment of a method of generating revenue associated with an integrated circuit chip manufacturer.

FIG. 9 illustrates one exemplary embodiment of a method 900 of generating revenue associated with the activation of an application on a computing device 100. Method 900 begins at start step 902. In one embodiment the process begins with a step 904 where there is generated a post-sale revenue receivable based upon a remote activation of a preloaded inactivated core application 112 incorporated in an integrated circuit chip, the integrated circuit chip incorporated in a computing device 100. Following step 904 in such embodiment is step 906 where the method associates at least a portion of the post-sale revenue receivable with an integrated circuit chip manufacturer. In one embodiment, the entire portion of the post-sale revenue receivable is associated with the IC chip manufacturer. Finally, method 900 ends with an end step 908.

In one embodiment, the step 904 is further limited such that the generation of the post-sale revenue (i.e., the revenue receivable associated with the activation) occurs after the integrated circuit chip is shipped from the integrated circuit chip manufacturer 910. In another embodiment, the step 904 is limited such that the generation of the post-sale revenue occurs after the integrated circuit chip is shipped from a computing device original equipment manufacturer 912. In yet another embodiment, the step 904 is limited such that the generation of the post-sale revenue occurs after the integrated circuit chip reaches a computing device consumer user 914. In another embodiment the method 900 is limited such that the post-sale revenue payable, corresponding to the post-sale revenue receivable, is due from a consumer user of the computing device 916. In another embodiment the computing device 100 is a portable wireless device 918. In another embodiment the remote activation occurs over a wireless network 920

Figure 10:
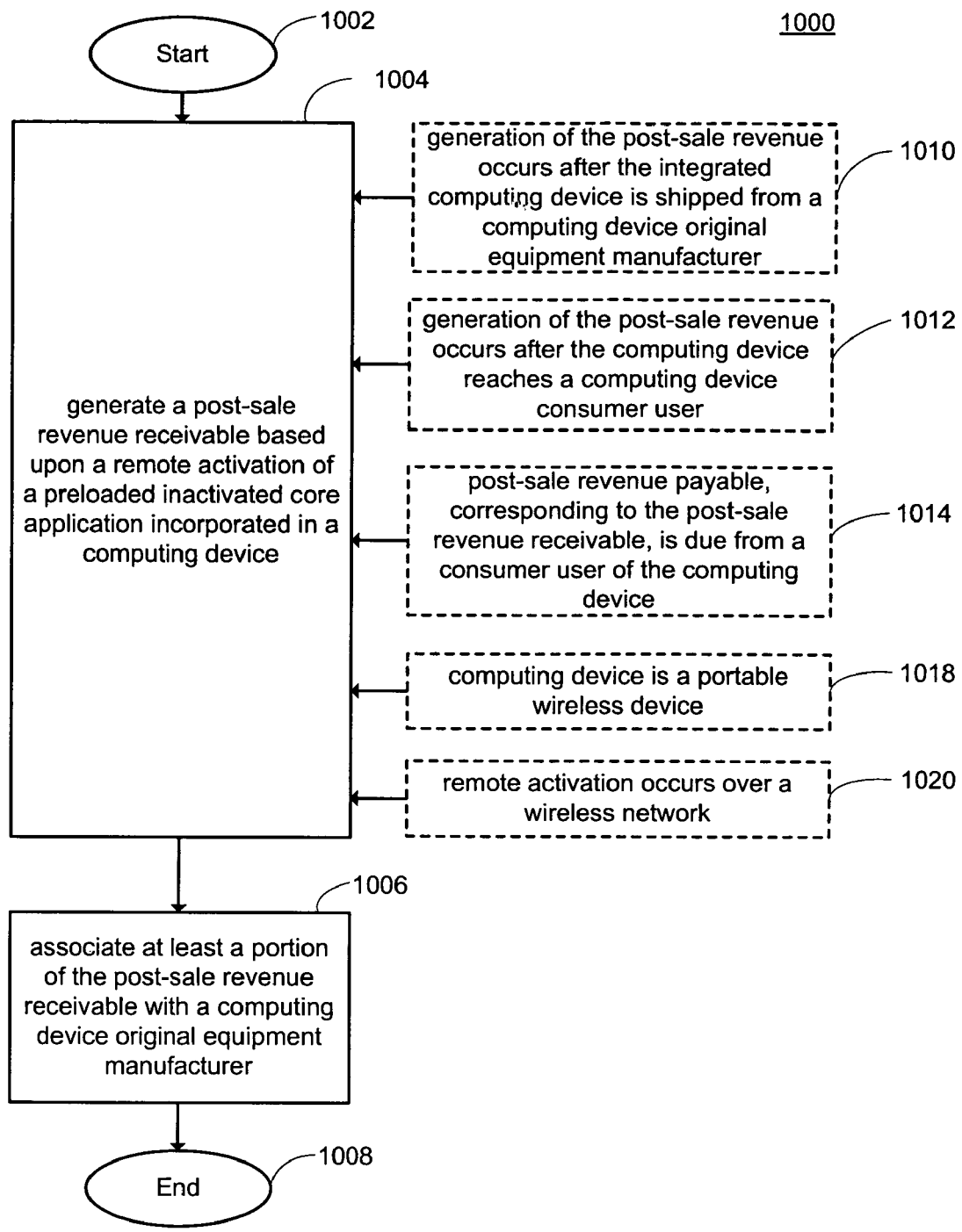
FIG. 10 shows one embodiment of a method of generating revenue associated with a computing device original equipment manufacturer.

FIG. 10 illustrates one exemplary embodiment of a method 1000 of generating revenue associated with the activation of an application on a computing device 100. Method 1000 begins at start step 1002. In one embodiment the process continues with step 1004 where the method includes the generating of a post-sale revenue receivable based upon a remote activation of a preloaded inactivated core application 112 incorporated in a computing device 100. Also included in such embodiment is step 1006 in which the method includes the associating of at least a portion of the post-sale revenue receivable with a computing device original equipment manufacturer. Also, following step 1006 is an end step 1008.

Step 1004 is also limited, in one embodiment, as shown in step 1010, such that the generation of the post-sale revenue occurs after the integrated computing device 100 is shipped from a computing device original equipment manufacturer. In another embodiment step 1012 is shown where the method 1000 is limited such that the generation of the post-sale revenue occurs after the computing device 100 reaches a computing device consumer user. In yet another embodiment, as shown in step 1014, the method 1000 is limited such that post-sale revenue payable, corresponding to the post-sale revenue receivable, is due specifically from a consumer user of the computing device 100. In one embodiment, as shown in step 1018, the computing device 100 is a portable wireless device. In another embodiment, as shown in step 1020, the remote activation occurs over a wireless network.

Figure 11:
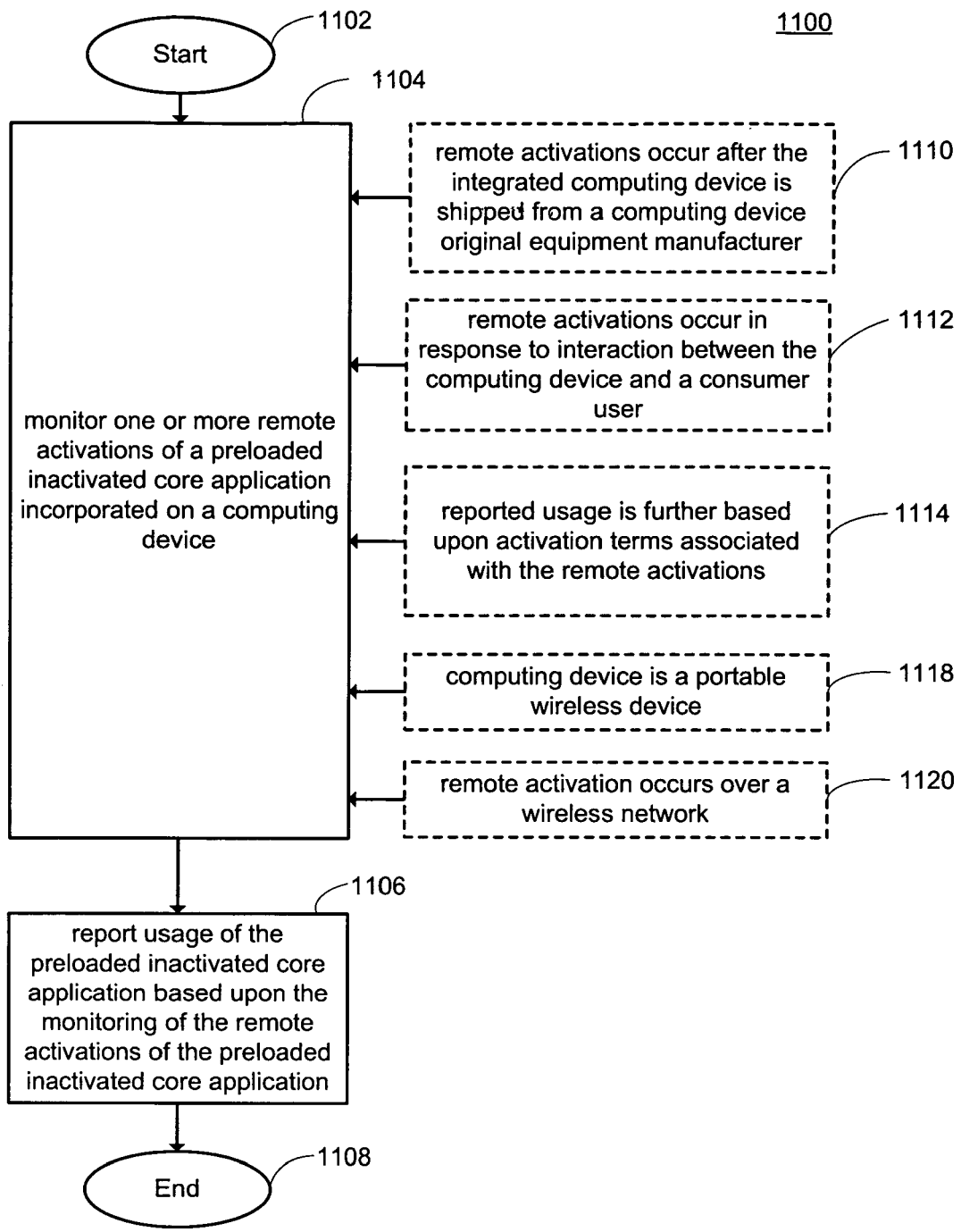
FIG. 11 shows one embodiment of a method of tracking usage of core application on a computing device.

FIG. 11 illustrates one exemplary embodiment of a method 1100 of generating revenue associated with the activation of an application on a computing device 100. Method 1100 begins at start step 1102. In one embodiment the process continues with step 1104 where the method monitors one or more remote activations of a preloaded inactivated core application 112 incorporated on a computing device 100. In such embodiment, step 1106 follows step 1104 where the method 1100 reports usage of the preloaded inactivated core application 112 based upon the monitoring of the remote activations of the preloaded inactivated core application 112. Following step 1106 is an end step 1108.

In one embodiment, as shown in step 1110, the method is limited such that remote activations occur after the integrated computing device 100 is shipped from a computing device original equipment manufacturer. In another embodiment, the method 1100 is limited such that remote activations occur in response to interaction between the computing device 100 and a consumer user 1112. For example, an input from the user may indicate that the method should proceed to activate the inactivated application where the user has agreed, for example, to pay a certain price (e.g., revenue payable) for such an activation. In yet another embodiment the method includes, as shown in step 1114, the reported usage is further based upon activation terms associated with the remote activations. For example, the activation terms may include license-type terms where, for example, an activation may include fifteen executions of the application, and here, the reported usage may add the number of licensed activations (fifteen) to a current total of activations. In another embodiment, as shown in step 1118, the computing device 100 is a portable wireless device. In another embodiment, as shown in step 1120, the remote activation occurs over a wireless network.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a computing device or user terminal. In the alternative, the processor and the storage medium may reside as discrete components in a computing device or user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of activating applications on a computing device, comprising the steps of:
   detecting power up of the computing device;
   detecting, in response to detecting a power up of the computing device, a preloaded inactivated core application;
   detecting license information on the computing device related to the preloaded inactivated core application;
   detecting whether the license information allows for activation of the preloaded inactivated core application;
   sending, over a network, and in response to detecting that the license information does not allow for activation of the preloaded inactivated core application, an activation inquiry request requesting an activation status associated with the preloaded inactivated core application, wherein the activation inquiry request includes an identifier of the preloaded inactivated core application and the computing device; and
   receiving the activation status associated with the preloaded inactivated core application.

2. The method of claim 1 further comprising the step of determining whether to activate the preloaded inactivated core application based upon the activation status and the current license terms.

3. The method of claim 2 further comprising the step of activating the preloaded inactivated core application in response to determining whether to activate the preloaded inactivated core application.

4. The method of claim 1 wherein the computing device is a portable wireless device.

5. A method of activating applications on a computing device, comprising the steps of:
   detecting power up of the computing device;
   detecting, in response to detecting power up of the computing device, a preloaded inactivated core application;
   detecting license information on the computing device related to the preloaded inactivated core application;
   detecting whether the license information allows for activation of the preloaded inactivated core application;
   sending, via a network, and in response to detecting that the license information does not allow for activation of the preloaded inactivated core application, an activation inquiry request requesting an activation status associated with the preloaded inactivated core application, an identifier of the preloaded inactivated core application and the computing device;
   receiving, at a server, via the network, the activation inquiry request requesting the activation status associated with the preloaded inactivated core application on the computing device;
   determining the activation status associated with the preloaded inactivated core application based on information associated with the computing device, the information stored remotely from the remote computing device;
   sending, to the computing device, via the network, the determined activation status; and
   receiving, at the computing device, via the network, the activation status associated with the preloaded inactivated core application.

6. The method of claim 5 further comprising the step of determining in the computing device whether to activate the preloaded inactivated core application based upon the received activation status.

7. The method of claim 6 further comprising the step of activating the preloaded inactivated core application in response to determining whether to activate the preloaded inactivated core application.

8. A computing device, comprising:
   a memory having stored thereon
      a preloaded inactivated core application, and license information for the preloaded inactivated core application; and
a processor coupled to the memory which processes;
　logic configured to detect power up of the computing device;
　logic configured to detect the preloaded inactivated core application in response to detecting power up of the computing device;
　logic configured to detect the license information;
　logic configured to detect whether the license information allows for activation of the preloaded core application;
　logic configured to generate and send, via a network, in response to detecting that the license information does not allow for activation of the preloaded inactivated core application, an activation inquiry request requesting an activation status associated with the preloaded inactivated core application, wherein the activation inquiry request includes an identifier of the preloaded inactivated core application and the computing device; and
　logic configured to receive, via a network, and process the activation status associated with the preloaded inactivated core application.

9. The computing device of claim 8 wherein the processor processes logic configured to determine whether to activate the preloaded inactivated core application based upon the activation status.

10. The computing device of claim 9 wherein the processor processes logic configured to activate the preloaded inactivated core application in response to a signal generated by the logic to determine whether to activate the preloaded inactivated core application.

11. The computing device of claim 8 wherein the computing device is a portable wireless device.

12. An integrated circuit chip, comprising:
　memory having stored thereon a preloaded inactivated core application and license information related to the preloaded inactivated core application;
　logic configured to detect power up of a computing device in which the integrated circuit chip is installed;
　logic configured to detect the license information related to the preloaded inactivated core application in response detecting power up of the computing device;
　logic configured to detect whether the license information allows for activation of the preloaded core application;
　logic configured to send, over a network, and in response to detecting that the license information does not allow for activation of the preloaded inactivated core application, an activation inquiry request requesting an activation status associated with the preloaded inactivated core application, wherein the activation inquiry request includes an identifier of the preloaded inactivated core application and the computing device;
　logic configured to receive the activation status associated with the preloaded inactivated core application; and
　logic configured to allow for the activation of the preloaded inactivated core application after the integrated circuit chip has been installed in a computing device based on the received activation status.

13. The integrated circuit chip of claim 12 wherein the computing device is a portable wireless device.

14. A system, comprising:
　a computing device including:
　　memory having stored thereon a preloaded inactivated core application and license information related to the preloaded inactivated core application; and
　　a processor coupled to the memory which processes;
　　　logic configured to detect power up of the computing device;
　　　logic configured to detect the preloaded inactivated core application in response to detecting power up of the computing device;
　　　logic configured to detect the license information related to the preloaded inactivated core application;
　　　logic to detect whether the license information allows for activation of the preloaded inactivated application;
　　　logic configured to generate and send an activation inquiry request requesting an activation status associated with the preloaded inactivated core application in response to detecting that the license information does not allow for activation of the preloaded inactivated core application, wherein the activation inquiry request includes an identifier of the preloaded inactivated core application and the computing device; and
　　　logic configured to receive and process the activation status associated with the preloaded inactivated core application; and
　a server including:
　　logic configured to receive the activation inquiry request requesting an activation status associated with the preloaded inactivated core application on the computing device;
　　logic configured to determine the activation status based on information associated with the computing device, the information stored remotely from the computing device; and
　　logic configured to send the determined activation status to the computing device.

15. The system of claim 14 further comprising the processor processing logic configured to determine whether to activate the preloaded inactivated core application based upon the activation status.

16. The system of claim 14 wherein the logic configured to determine the activation status further includes logic configured to process an activation inquiry request including identification information identifying the specific computing device and identifying the preloaded inactivated core application.

17. A computer readable storage medium embodying a set of instructions executable by one or more processors on a computing device, wherein the set of instructions comprises:
　code operable to detect power up of the computing device;
　code operable to detect, on the computing device, a preloaded inactivated core application stored on the computing device in response to detecting power up of the computing device;
　code operable to detect license information stored on the computing device related to the preloaded inactivated core application;
　code operable to detect whether the license information allows for activation of the preloaded inactivated core application;
　code operable to send, via a network, and in response to detecting that the license information does not allow for activation of the preloaded inactivated core application, an activation inquiry request requesting an activation status associated with the preloaded inactivated core application, wherein the activation inquiry request includes an identifier of the preloaded inactivated core application and the computing device; and code operable to receive, via a network, the activation status associated with the preloaded inactivated core application.

18. The computer readable storage medium of claim 17, further comprising code operable to determine whether to activate the preloaded inactivated core application based upon the activation status.

19. The computer readable storage medium of claim 18, further comprising code operable to activate the preloaded inactivated core application in response to a signal generated by the code to determine whether to activate the preloaded inactivated core application.

20. A computing device having a processor, comprising:
means for storing a preloaded inactivated core application;
means for storing license information related to the preloaded inactivated core application;
means for detecting power up of the computing device;
means for detecting the preloaded inactivated core application in response to detecting power up of the computing device;
means for detecting the license information related to the preloaded inactivated core application;
means for detecting whether the license information allows for activation of the preloaded inactivated core application;
means for generating and sending, via a network, and in response to detecting that the license information does not allow for activation of the preloaded inactivated core application, an activation inquiry request requesting an activation status associated with the preloaded inactivated core application, wherein the activation inquiry request includes an identifier of the preloaded inactivated core application and the computing device; and
means for receiving, via the network, and process the activation status associated with the preloaded inactivated core application.

21. The computing device of claim 20, further comprising means for determining whether to activate the preloaded inactivated core application based upon the activation status.

22. The computing device of claim 21, further comprising means for activating the preloaded inactivated core application in response to a signal generated by the logic to determine whether to activate the preloaded inactivated core application.

23. An integrated circuit chip, comprising:
means for storing a preloaded inactivated core application;
means for storing license information related to the preloaded inactivated core application;
means for detecting power up of a computing device;
means for detecting the license information related to the preloaded inactivated core application in response to detecting power up of the computing device;
means for detecting whether the license information allows for activation of the preloaded inactivated core application;
means for sending, over a network, and in response to detecting that the license information does not allow for activation of the preloaded inactivated core application, an activation inquiry request requesting an activation status associated with the preloaded inactivated core application, wherein the activation inquiry request includes an identifier of the preloaded inactivated core application and the computing device;
means for receiving the activation status associated with the preloaded inactivated core application; and
means for allowing for the activation of the preloaded inactivated core application after the integrated circuit chip has been installed in a computing device based on the received activation status.

24. A system, comprising:
a computing device including:
means for storing a preloaded inactivated core application;
means for storing license information related to the preloaded inactivated core application;
means for detecting power up of the computing device
means for detecting the preloaded inactivated core application in response to detecting power up of the computing device;
means for detecting the license information related to the preloaded inactivated core application;
means for generating and sending an activation inquiry request requesting an activation status associated with the preloaded inactivated core application in response to detecting that the license information does not allow for activation of the preloaded inactivated core application, wherein the activation inquiry request includes an identifier of the preloaded inactivated core application and the computing device; and
means for receiving and processing an activation status associated with the preloaded inactivated core application; and
a server including:
means for receiving the activation inquiry request from the computing device requesting an activation status associated with the preloaded inactivated core application on the computing device;
means for determining the activation status based on information associated with the computing device, the information stored remotely from the computing device; and means for sending the activation status to the computing device.

* * * * *